United States Patent [19]

Michelena et al.

[11] Patent Number: 5,421,837
[45] Date of Patent: * Jun. 6, 1995

[54] PROCESS FOR MANUFACTURING A SOLID FUEL

[75] Inventors: Ramsay Michelena; María M. Pérez, both of Caracas; Alejandro Requena, El Cementerio; George Pinto, Caracas, all of Venezuela

[73] Assignee: Corpoven, S.A., Caracas, Venezuela

[*] Notice: The portion of the term of this patent subsequent to Oct. 5, 2010 has been disclaimed.

[21] Appl. No.: 110,531

[22] Filed: Aug. 23, 1993

Related U.S. Application Data

[62] Division of Ser. No. 959,545, Oct. 13, 1992, Pat. No. 5,250,080.

[51] Int. Cl.⁶ .................................................. C10L 5/16
[52] U.S. Cl. ............................................. 44/575; 44/576
[58] Field of Search .................................... 44/575, 576

[56] References Cited

U.S. PATENT DOCUMENTS

| | | | |
|---|---|---|---|
| 4,255,155 | 3/1981 | Frankovich | 44/595 |
| 4,548,615 | 10/1985 | Lonchamp et al. | 44/561 |
| 4,596,584 | 6/1986 | Darby | 44/576 |
| 5,049,163 | 9/1991 | Huang et al. | 44/596 |
| 5,250,080 | 10/1993 | Michelena et al. | 44/575 |

Primary Examiner—Jerry D. Johnson
Attorney, Agent, or Firm—Bachman & LaPointe

[57] ABSTRACT

A process is disclosed for manufacturing solid fuel which includes the steps of mixing a biomass, a heavy hydrocarbon and a sorbent to form a hydrocarbon-biomass slurry, the biomass being characterized by a particle size and distribution of about 50% between about 250–2000 μm and about 50% less than about 250 μm, and more preferably as follows:

| distribution | particle size |
|---|---|
| 10–20% | 1250–2000 μm |
| 10–20% | 500–1250 μm |
| 10–20% | 250–500 μm |
| balance | ≦250 μm | compacting the slurry to form a solid fuel agglomerate; and baking the agglomerate so as to form a solid fuel briquette having a resistance to compression of at least about 22 kg/cm². The mixing step includes the step of mixing the biomass, hydrocarbon and sorbent in the following proportions, by weight:

| | |
|---|---|
| biomass | 50–70%; |
| hydrocarbon | 30–45%; and |
| sorbent | 5–10%. |

Mixing is preferably carried out at a temperature of between about 200° to 300° C. Compacting is preferably carried out at a temperature of between about 200° to 250° C. and a pressure of between about 1000 to 1500 psig. Baking is preferably carried out under anaerobic conditions at a temperature of between about 320° to 400° C. for a time of between about 15 to 90 minutes.

5 Claims, 1 Drawing Sheet

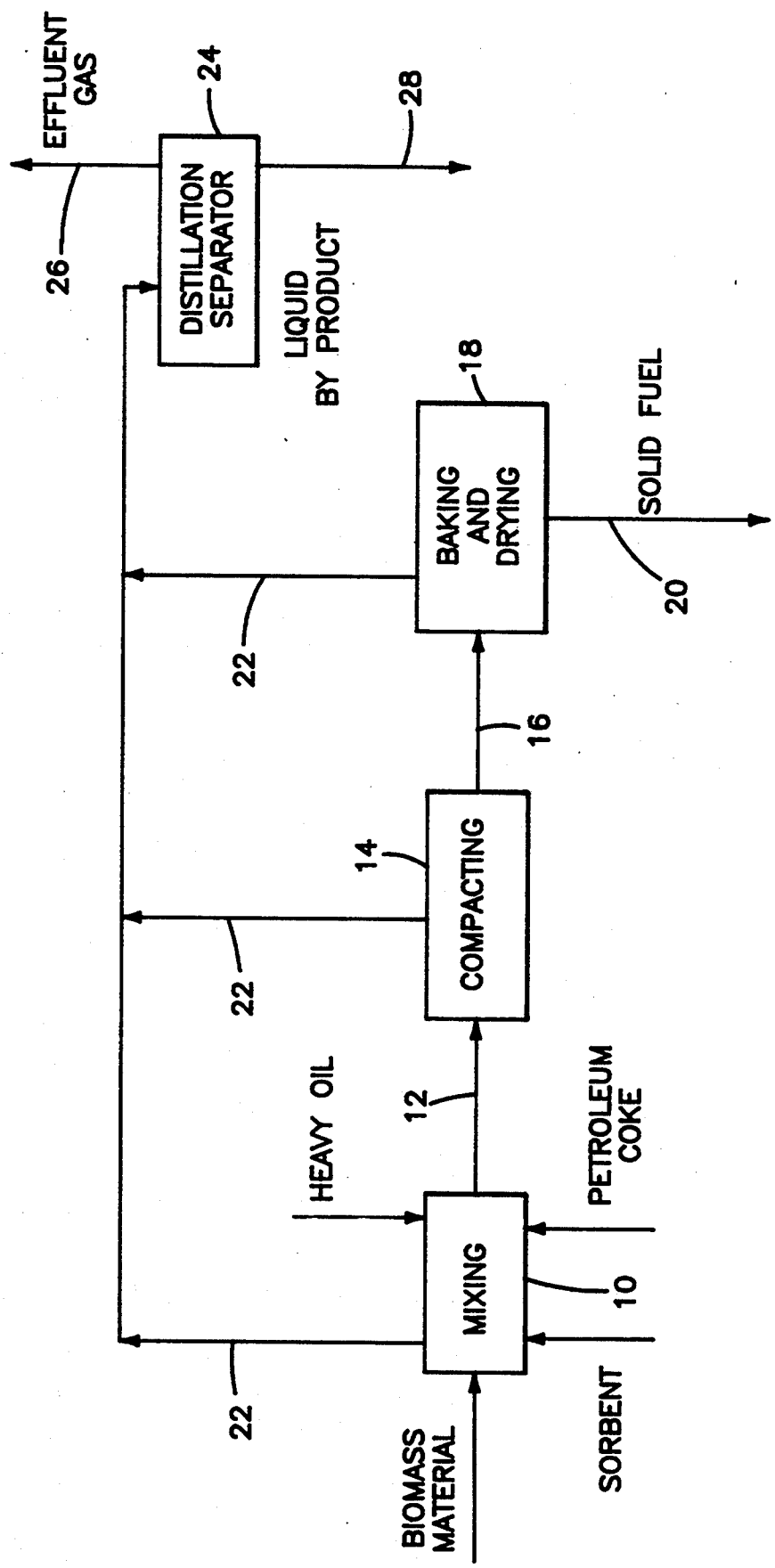

PROCESS FOR MANUFACTURING A SOLID FUEL

This is a division of application Ser. No. 07/959,545 filed Oct. 13, 1992 now U.S. Pat. No. 5,250,080.

BACKGROUND OF THE INVENTION

The invention relates to the field of solid fuels and, more particularly, to a process for manufacturing a solid fuel from a biomass and heavy crude oil, which solid fuel exhibits improved compression resistance and low density.

Solid fuels made from biomass and heavy crude oil are advantageous in that they make use of heavy and extra heavy crude oil and industrial and urban waste products to provide a useful solid fuel product.

Heavy crude oil exists in large supply. Large reserves are known to exist in various locations in Canada, Europe, Mexico, U.S.A., and Venezuela. For example, the Orinoco River Belt in Venezuela holds enough heavy and extra heavy crude oil to supply world energy needs for years. These heavy and extra heavy crude oils are very viscous, however, and are therefore difficult to transport through conventional means. This problem is exacerbated by the fact that the centers of demand for energy are generally located at points distant from the source of such heavy crude oil reserves. It is therefore apparent that an economical method of transport for such heavy crude oil is desirable.

Solid fuels are one answer to this problem. These fuels are frequently manufactured so as to incorporate heavy crude oil with biomass material. Such biomass material is generally otherwise classified as industrial or urban waste. Thus, solid fuels provide a use for such waste material and also provide a vehicle allowing heavy crude oil to be economically transported through conventional means.

Several methods for manufacturing such solid fuels are known in the art, such as those disclosed in U.S. Pat. No. 4,548,615, to Lonchamp, et al, UK Patent Application No. GB 2,137,653 A, and French Patent No. 2,561,253. These patents disclose methods for mixing high viscosity oil with organic material to obtain solid fuels. Solid fuels manufactured according to these teachings do not exhibit acceptable resistance to compression. High resistance to compression is desirable, however, in order to provide a solid fuel which will withstand compression concomitant with transportation over long distances. It is also desirable for such solid fuels to have a low density, and a high resistance to erosion during transportation and handling of the solid fuel.

It is, therefore, the principal object of the present invention to provide a process for manufacturing a solid fuel which has a high resistance to compression, a low density, and a high resistance to erosion.

It is a further object of the invention to provide a process for manufacturing a solid fuel which utilizes heavy and extra heavy crude oil and industrial and urban waste materials as biomass, so as to provide a useful utilization of both resources.

Other objects and advantages will become apparent to one skilled in the art upon a consideration of the following disclosure.

SUMMARY OF THE INVENTION

The foregoing objects and advantages are obtained by the presently disclosed process for manufacturing solid fuels, wherein biomass of a specific particle size and particle size distribution is used, in conjunction with heavy and extra heavy crude oil hydrocarbons and sorbents, to provide a solid fuel having the aforedescribed properties.

The process, according to the invention, includes the steps of mixing a biomass, a heavy hydrocarbon and a sorbent to form a hydrocarbon-biomass slurry, said biomass being characterized by a particle size and particle size distribution of about 50% between about 250–2000 μm and about 50% less than about 250 μm, and more preferably as follows:

| distribution | particle size |
| --- | --- |
| 10–20% | 1250–2000 μm |
| 10–20% | 500–1250 μm |
| 10–20% | 250–500 μm |
| balance | ≦250 μm; | compacting said slurry to form a solid fuel agglomerate; and baking said agglomerate so as to form a solid fuel briquette having a resistance to compression of at least about 22 kg/cm².

The mixing step preferably comprises the step of mixing said biomass, said hydrocarbon and said sorbent in the following proportions, by weight:

| biomass | 50–70%; |
| --- | --- |
| hydrocarbon | 30–45%; and |
| sorbent | 5–10%. |

According to the invention, mixing is preferably carried out at a temperature of between about 200° to 300° C. Compacting is preferably carried out at a temperature of between about 200° to 250° C. and a pressure of between about 1000 to 1500 psig. The baking step is preferably carried out under anaerobic conditions at a temperature of between about 300° to 400° C. for a time of between about 15 to 90 minutes.

The biomass may preferably be selected from a group consisting of wood, pinetree needles, sawdust, industrial dust discharge, paper mill residue, pinetree moss, forest weeds and cereal shell.

BRIEF DESCRIPTION OF THE DRAWING

A detailed description of the invention follows, with reference to the attached drawing, which schematically depicts the various steps of the process for manufacturing solid fuel, according to the invention.

DETAILED DESCRIPTION OF THE INVENTION

The invention relates to a process for manufacturing a solid fuel from heavy and extra heavy crude oil hydrocarbons and biomass material.

According to the invention, solid fuel is manufactured by mixing biomass material, heavy hydrocarbon and sorbent to form a hydrocarbon-biomass slurry, compacting the slurry to obtain an agglomerate, and baking and drying the agglomerate to obtain a solid fuel. The attached drawing schematically illustrates these steps.

As shown, a biomass, heavy crude oil and sorbent are mixed in mixing step 10 to form a hydrocarbon-biomass slurry 12. Slurry 12 is compacted in compacting step 14 to form a solid fuel agglomerate 16.

Agglomerate 16 is then baked in baking and drying step 18 to form solid fuel 20.

Suitable biomass material may preferably include wood, pinetree needles, sawdust, industrial dust discharge, paper mill residue, pinetree moss, forest weeds, cereal shell and the like. The biomass material preferably has a water content of about 10% by weight. Such starting biomass material may be obtained by using material having such a water content, or by conventionally treating biomass material having a larger water content, for example by pressing or by conventional drying, so as to remove some of the water.

It has been found, according to the invention, that the particle size distribution of the biomass material is critical to obtaining improved compression resistance. The biomass preferably has a particle size and particle size distribution of about 50% between about 250–2000 $\mu m$ and about 50% less than about 250 $\mu m$, and more preferably as follows:

| distribution | particle size |
|---|---|
| 10–20% | 1250–2000 $\mu m$ |
| 10–20% | 500–1250 $\mu m$ |
| 10–20% | 250–500 $\mu m$ |
| balance | $\leq$ 250 $\mu m$. |

Heavy crude oil supplied to mixing step 10 is preferably a crude oil having an API gravity at 60° C. of between about 8 to 12 degrees. Such a crude oil may be, for example, Hamaca or Cerro Negro crude oil from the Orinoco Belt in Venezuela. The crude oil may be expected to have a sulfur content of between about 2.5 to 4.5% by weight. This crude oil also suitably has a viscosity at 60° C. of between about 4000 to 6000 cp.

Sorbent material supplied to mixing step 10 may preferably be calcium, calcium hydroxide or gypsum or the like, and more preferably calcium hydroxide. The sorbent may preferably be added in amounts sufficient to provide a ratio of sorbent to sulfur in the heavy hydrocarbon, by weight, of between about 1.5 to 2.5. The sorbent material is added so as to absorb sulphur emissions when the resulting solid fuel is burned.

The foregoing mixture components are preferably mixed in the following amounts, by weight:

| biomass | 50–70%; |
|---|---|
| hydrocarbon | 30–45%; and |
| sorbent | 5–10%. |

Petroleum coke or other carbon containing additive may optionally be added to slurry 12. Petroleum coke additive may be helpful, for example, if the heavy hydrocarbon contains sulfur in unacceptable levels. In the embodiment wherein petroleum coke is added to slurry 12, such coke may preferably be added in an amount, by weight, of between about 5 to 20%, more preferably between about 5 to 12%, and may preferably have a grain size between about 2 to 4 $\mu m$.

Mixing step 10 is preferably carried out at a temperature of between about 200° to 300° C.

At this temperature, effluent gasses are formed during the mixing stage. These gasses exhibit high calorific values and are, therefore, a useful by-product of the process. One known use of distillates of such effluent gas is as a wood protective coating composition. During the steps of mixing 10, compacting 14 and baking 18, therefore, effluent gasses escaping during the process are preferably gathered and can be treated, for example in distillation separating step 24, to obtain separated effluent gas 26 and liquid by-product 28 for subsequent use.

The hydrocarbon-biomass slurry 12 formed in mixing step 10 preferably has a composition by weight of between about 40 to 60% biomass and between about 30 to 45% hydrocarbon.

Next, slurry 12 is compacted in compacting step 14 under a pressure of between about 1000 to 1500 psig and at a temperature preferably between about 200° to 250° C. Compacting step 14 forms agglomerate 16 preferably having a ratio of biomass to hydrocarbon, by weight, of between about 0.40 to 0.85. Agglomerate 16 also preferably has a ratio of sorbent to sulfur, by weight, of between about 1.5 to 2.5.

Agglomerate 16 is baked and dried to provide solid fuel. Baking and drying step 18 is preferably carried out at a temperature of between about 300° to 400° C. for a time preferably between about 15 to 90 minutes. The time and temperature are interrelated in that a shorter time is necessary with a higher temperature. For example, at 400° C., 15 minutes would be sufficient. Baking step 18 may also preferably be carried out under anaerobic conditions.

The solid fuel manufactured according to the process of the present invention exhibits a density which is relatively low, generally in the range of about 0.75 g/cm$^3$. Despite the relatively low density, the solid fuel exhibits a resistance to compression which is greatly improved over the compression resistance exhibited by solid fuels manufactured according to the prior art. This relatively low density is advantageous in that it allows for cheaper transportation in addition to the improved compression resistance. Solid fuel manufactured according to the present invention possesses a compression resistance of at least about 22 kg/cm$^2$, as demonstrated in the examples set forth hereinbelow.

The solid fuel manufactured according to the present invention can be formed, either before or after the baking step, into a form for convenient use, such as briquettes or the like. Briquettes manufactured according to the present invention possess excellent resistance to exposure to water.

The solid fuel manufactured according to the present invention has physical properties as set forth in Table I below.

TABLE I

| Moisture content (% wt) | 2 |
|---|---|
| Ash content (% wt) | 7.9 |
| Volatile material (% wt) | 64.0 |
| LHV (BTU/lb) | 12000–13000 |
| Density (g/cm$^3$) | $\geq$ 0.75 |
| SO$_2$ (lb)/MMBTU | 1.7 |
| Compression resistance (kg/cm$^2$) | $\geq$ 22.0 |
| Hardgrove Index | 120 |

As shown in Table 1, solid fuel produced according to the present invention exhibits a relatively high Hardgrove index, thus indicating that the solid fuel is relatively easy to pulverize in a combustion plant. By way of comparison, normal coal has a Hardgrove index of between about 50–80.

The improved characteristics of the solid fuel obtained according to the present invention are further demonstrated by the following examples.

EXAMPLE 1

This example demonstrates the importance of the particle size and particle size distribution of the starting biomass material. 1000 g of Hamaca crude oil from Venezuela, having a viscosity of 4200 cp at 60° C. was heated to 250° C. and mixed with 1121 g of pinetree moss and 99 g of calcium hydroxide. The biomass material had a water content of 10% and was 90% dry material. Three different particle size distributions were used as listed below in Table 2.

TABLE 2

| Briquette Type | Biomass particle size distribution ($\mu$m) |
| --- | --- |
| A | 250 to 500 |
| B | 500 to 1250 |
| C | 50% ≦250 |
|   | 50% 250 to 2000 |

The slurry thus formed was pressed in cylindrical molds at a pressure of 1000 psig and thereafter was baked and dried for 30 minutes at a temperature of 400° C. under anaerobic conditions. Briquettes formed for each particle size distribution exhibited properties as listed below in Table 3.

TABLE 3

| Briquette type | Density g/cm$^3$ | Compression Resistance (kg/cm$^2$) 10% deformation | Maximum |
| --- | --- | --- | --- |
| A | 0.63 | 11.57 | 14.52 |
| B | 1.04 | 3.88 | 11.70 |
| C | 1.08 | 21.65 | 32.65 |

As demonstrated, particle size and particle size distribution of the biomass material has a marked effect on the compression resistance of the solid fuel thus formed. Briquette C, formed according to the teachings of the present invention, exhibits a drastically increased compression resistance when compared to Briquettes A and B, which were formed using different particle size distributions of biomass.

EXAMPLE 2

1000 g of the same crude oil as was used in Example 1 above was heated to 250° C. and mixed with 1300 g of pinetree moss in one case (Briquette D) and mixed with 1300 g of pinetree needles in another case (Briquette E). Both agglomerates were made according to the teachings of French Patent No. 2,561,253 except that a higher compacting pressure (2000 psig) was used in order to obtain an agglomerate which was not pasty and inconsistent. The biomass had a water content of 25% and was 75% dry material.

The agglomerates so obtained were made cylindrical in shape having a diameter of about 5 cm. The agglomerates were baked and dried under anaerobic conditions at a temperature of 250° C. for 50 minutes according to the process disclosed in U.S. Pat. No. 3,684,465, to Hsu et al (a patent disclosing a general process for baking solid fuel briquettes). Briquettes D and E, manufactured as above, were tested, the results being set forth in Table 4 below.

TABLE 4

| Briquette Type | Density (g/cm$^3$) | Compression Resistance Maximum (kg/cm$^2$) |
| --- | --- | --- |
| D | 0.65 | 16.3 |
| E | 0.50 | 6.8 |

This further demonstrates that the particle size distribution used according to the process of the present invention is critical to obtaining improved compression resistance. As shown in the table, briquettes manufactured according to the process of the French patent, and baked according to the '465 patent, still do not possess the improved compression resistance demonstrated by solid fuel manufactured according to the present invention.

EXAMPLE 3

A briquette was made identical to briquette A above, except that the biomass particle size was between 250 to 400 $\mu$m, no sorbent was used, and the baking and drying step was omitted. This briquette was made in accordance with the teachings of aforesaid French patent No. 2,561,253. The briquette so made had a density of 0.81 g/cm$^3$, a 10% compression resistance of 1.36 kg/cm$^2$ and a maximum compression resistance of between about 1.2 to 2.85 kg/cm$^2$.

As illustrated by the above examples, solid fuel manufactured according to the process of the present invention possesses improved compression resistance.

As demonstrated, fuels manufactured according to the present invention also exhibit improved resistance to erosion during transportation and handling, and also possess a relatively low density.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A solid fuel composition resulting from a process for manufacturing a solid fuel comprising the steps of mixing a biomass, a heavy hydrocarbon having an API gravity at 60° C. of between 8 to 12 and a sulfur sorbent to form a hydrocarbon-biomass slurry, said biomass being characterized by a particle size and a particle size distribution of about 50% between about 250 to 2000 $\mu$m and about 50% less than about 250 $\mu$m; compacting said slurry to form a solid fuel agglomerate; and baking said agglomerate to form a solid fuel briquette, said solid fuel composition being characterized by the following chemical and physical properties; biomass—50 to 70% by wt.; hydrocarbon—30 to 45% by wt.; sorbent in a ratio with respect to sulfur in the hydrocarbon of between 1.5 to 2.5 maximum resistance to compression of at least about 22 kg/cm$^2$.

2. A solid fuel composition according to claim 1 wherein said biomass is wood, pine tree needles, sawdust, industrial dust discharge, paper mill residual, pine tree moss, forest weeds or cereal shell.

3. A solid fuel composition according to claim 1 wherein said hydrocarbon has a viscosity at 60° C. of between about 4000 to 6000 cp.

4. A solid fuel composition according to claim 1 wherein said sorbent is calcium hydroxide.

5. A solid fuel composition comprising about 45% by wt. of a heavy hydrocarbon having a viscosity at 60° C. of about 4200 cp, about 50.5% by wt. pine tree moss and about 4.5% by wt. calcium hydroxide, said solid fuel composition being characterized by a maximum resistance to compression of at least about 22 kg/cm$^2$.

* * * * *